United States Patent [19]

Gendreu et al.

[11] 4,103,300
[45] Jul. 25, 1978

[54] AIR NAVIGATION AND LANDING AID SYSTEM

[75] Inventors: Robert Gendreu; Maurice Chabah, both of Paris, France

[73] Assignee: Thomson-CSF, Paris, France

[21] Appl. No.: 532,686

[22] Filed: Dec. 13, 1974

[30] Foreign Application Priority Data

Dec. 14, 1973 [FR] France ............... 73 44802
Mar. 28, 1974 [FR] France ............... 74 10898

[51] Int. Cl.² ............... G01S 9/56; G01S 9/60
[52] U.S. Cl. ............... 343/6 R; 343/5 LS; 343/5 W; 364/427; 364/451
[58] Field of Search ............ 343/6 R, 6 DF, 5 LS, 343/5 W, 108 R, 109; 235/150.22

[56] References Cited

U.S. PATENT DOCUMENTS

| 3,312,970 | 4/1967 | Bond ............... 343/6 R |
| 3,775,599 | 11/1973 | Gendreu ............... 343/5 LS |
| 3,775,766 | 11/1973 | Gendreu et al. ............... 343/5 W |
| 3,787,841 | 1/1974 | Buehler et al. ............... 343/108 R |

Primary Examiner—Maynard R. Wilbur
Assistant Examiner—Richard E. Berger
Attorney, Agent, or Firm—Cushman, Darby & Cushman

[57] ABSTRACT

An air navigation and landing aid system wherein a pair of transponder beacons are located at known positions adjacent an airport runway. The aircraft carries a weather pulse radar system and an antenna for furnishing information affording a navigation aid during the flight stage. Switching means are inserted between the antenna and the weather radar for switching, during the landing stage, the received pulses relating to each beacon, in response to the interrogation of the weather radar, to a special receiver and a processing circuit which furnishes information affording a landing aid.

18 Claims, 18 Drawing Figures

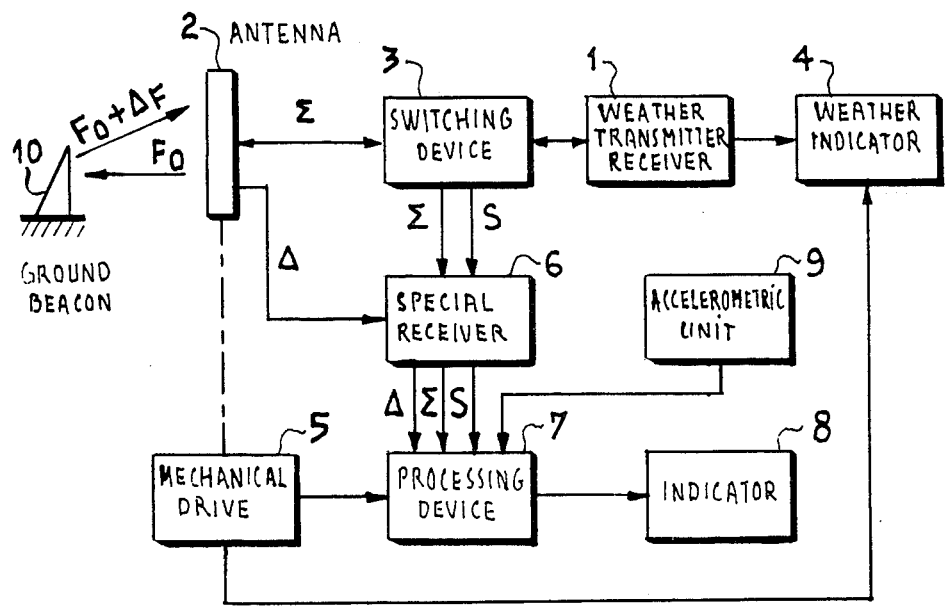
FIG_1
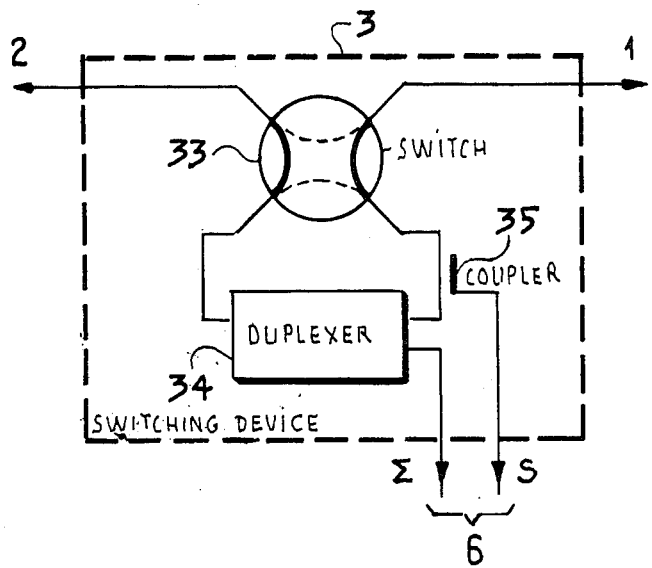
FIG_3

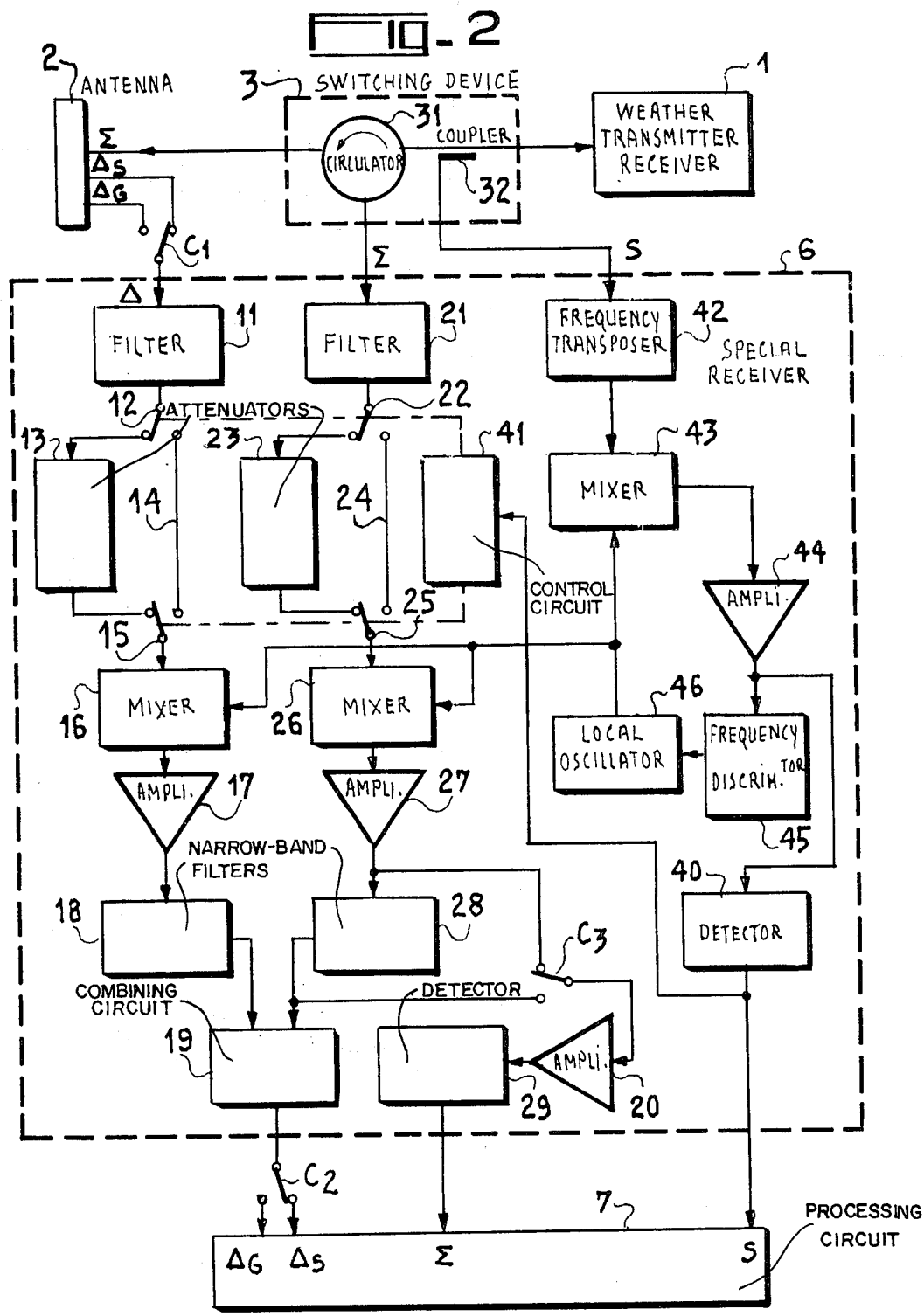

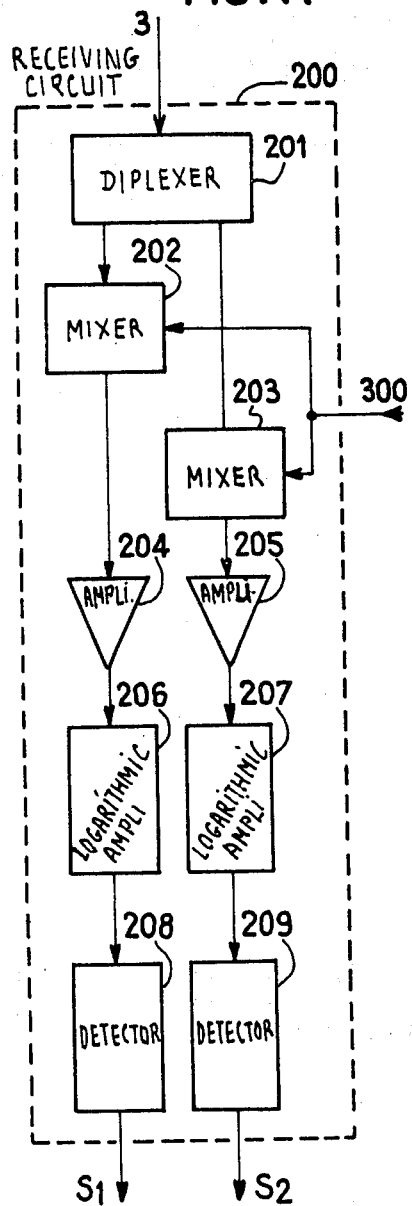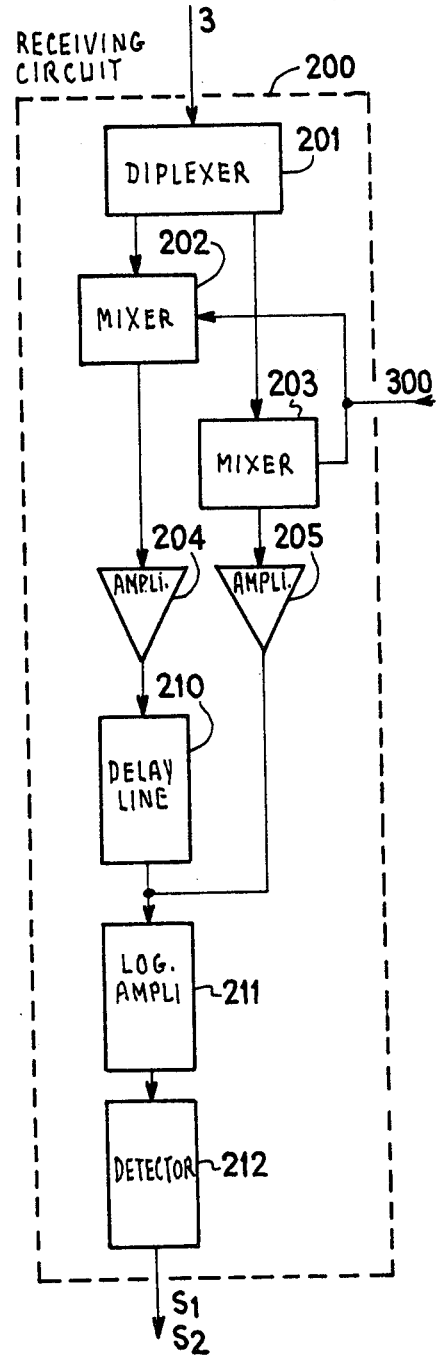

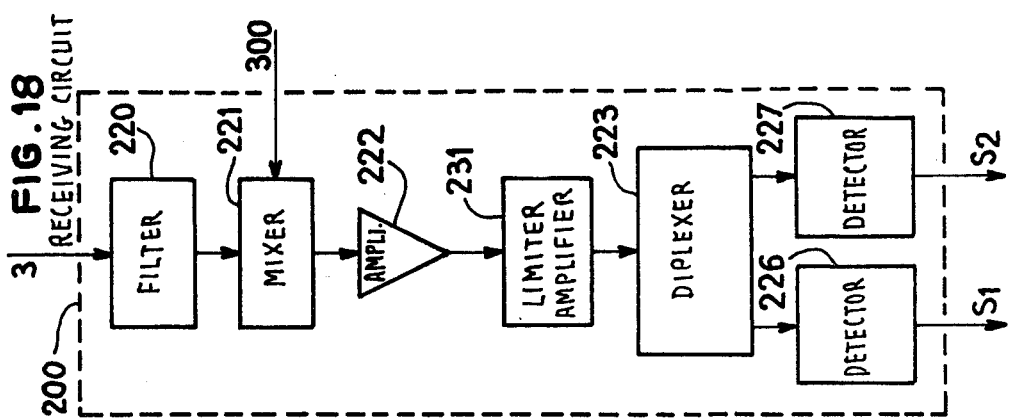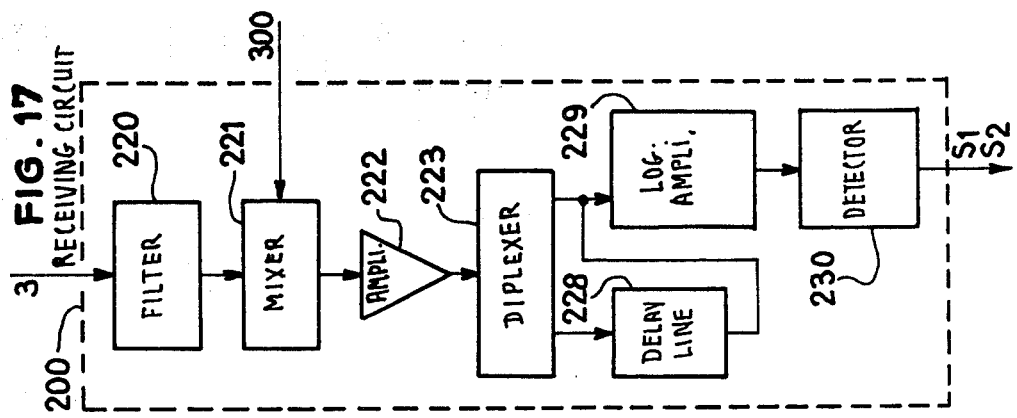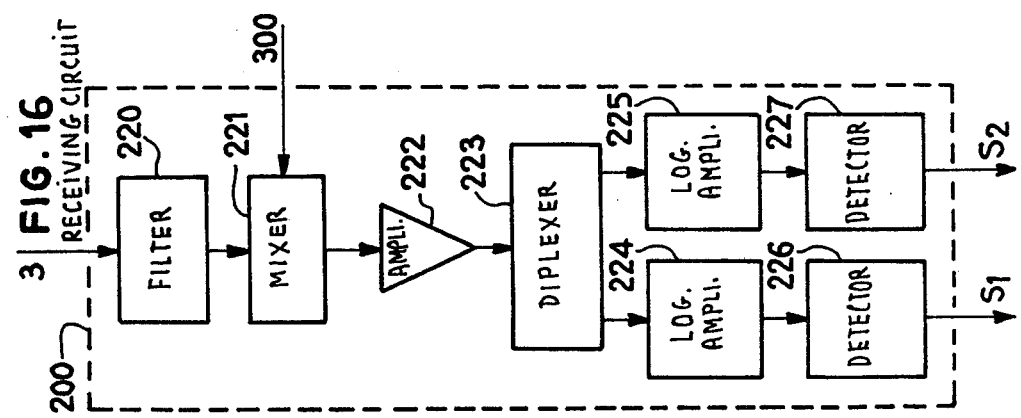

AIR NAVIGATION AND LANDING AID SYSTEM

The present invention relates to air navigation and in particular to landing aid systems. It concerns electromagnetic systems which may or may not operate in relation with usual airborne instruments which permanently afford the pilot indications concerning the surroundings and the path of the aircraft. In the course of the landing stage these systems determine the position of the aircraft with respect to the landing runway, its path, deviations between this path and an ideal path and permit an automatic piloting or a manual piloting of the aircraft in any weather.

There exist for the actual flight stage or cruising stage, radars termed "weather radars" which give information concerning the meteorological surroundings. These radars employ pulses of long duration with a low rate of renewal of the information since the sector of space that they observe is usually wide and deep.

For the landing stage, other systems exist which employ short pulses for obtaining good precision of the measured distances and a rapid rate of renewal of the information to suit the rapid displacement of the aircraft.

These last systems are designated by the expression "Independent Landing Monitoring Systems" or simply by the abbreviation "ILM" which will be employed hereinafter. They must not be confused with the conventional ILS (Instrument landing System) in which the aircraft depends on a certain number of transmitters on the ground and has only one receiver and one antenna, whereas the ILM system is a system independant of the ILS and permits checking the information given by the latter.

To obtain a navigational aid in all the stages of flight, it appears necessary to install on board the aircraft two separate navigation systems (weather and ILM), which is usually difficult bearing in mind the small amount of space available and the extra load that this involves.

Instead of two separate systems it is also possible to employ a single system capable of operating with short pulses during the landing and long pulses in the course of flight. However, this solution is costly since aircraft are usually already equiped with a weather radar which must then be dismantled and replaced by the aforementioned system.

An object of the present invention is to provide a new navigation system providing meteorological information during the actual flight and affording a landing aid without having the foregoing drawbacks.

According to one feature of the invention, the system comprises, on the ground, at least one transponder beacon, and airborne, an antenna, a mechanical drive device for the antenna, a weather transmitter-receiver coupled to the antenna, a special receiver, switching means inserted between said antenna and the weather transmitter-receiver, for switching during the landing stage the signals received by the antenna, relating to each beacon, to said special receiver, and a processing circuit connected to said special receiver and the mechanical drive device for the antenna for furnishing information affording a landing aid.

The system according to the invention may therefore be simply constructed in starting with the existing weather equipment with which there is combined the necessary complementary equipment for affording a landing aid. A place can be more easily found on board the aircraft for this complementary equipment than for a complete additional radar system.

As concerns the emission, the signals are emitted in the form of pulses of long duration issuing from the weather transmitter. In the usual weather construction, these pulses do not permit distance measurements which are precise enough, since, on one hand, it is difficult to discriminate the desired object from the other ground echoes and, on the other, the weather receiver does not employ all the information contained in the echo.

To obtain the required precision, the ground beacons re-transmit the signals received at the weather frequency with a different frequency. According to another feature of the invention, the special receiver operates at a frequency different from that of the weather transmitter within a sufficiently wide frequency band to employ all the information contained in each pulse received and it includes means for eliminating signals at the frequency of operation of the weather transmitter.

Other features of the invention will be apparent from the ensuing description with reference to the accompanying drawings in which:

FIG. 1 is a basic diagram of the system according to the invention,

FIG. 2 is a diagram of a special receiver, with an embodiment of a switching device;

FIG. 3 is an other embodiment of a switching device;

FIGS. 14, 15, 16, 17 and 18 are different embodiments of circuits for receiving and separating the signals from the beacons.

FIG. 1 shows a basic diagram of a navigation aid system according to the invention.

Figure 4:
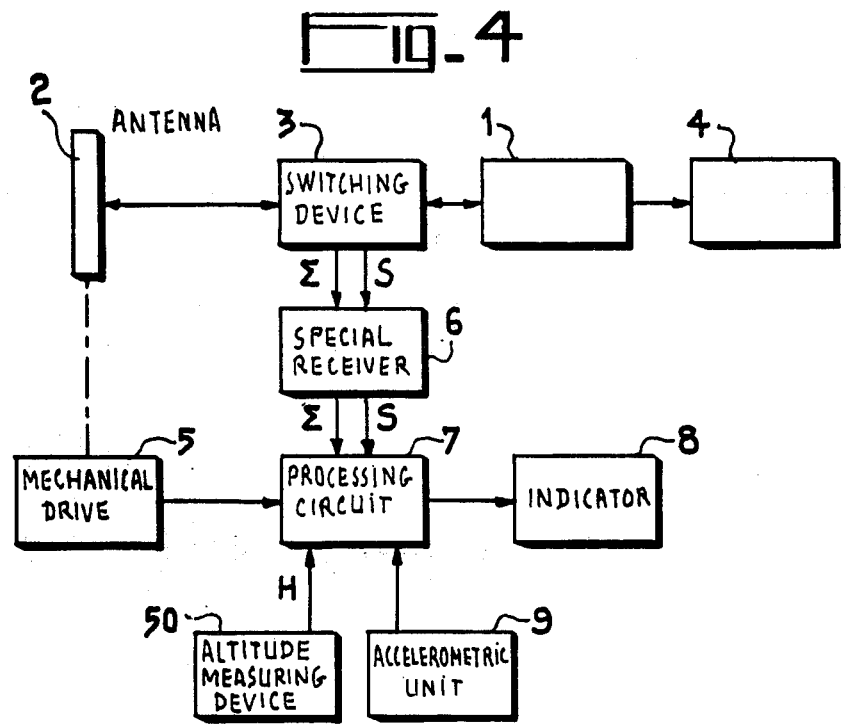
FIG. 4 is an example of the association of the system according to the invention with an altimeter measuring device.

It comprises a conventional weather radar and elements which are associated therewith for affording, instead of or in addition to the weather function, a landing aid.

The weather radar comprises a transmitter-receiver 1 connected to an antenna 2. The connecting means between the antenna and the transmitter-receiver comprise a switching device 3 which will be described hereinafter. Connected to the output of the weather receiver is a weather indicator 4. The antenna 2 is movable and is moved by a mechanical drive device 5 which also stabilizes the antenna as concerns roll and pitch. There is a connection between the drive device 5 and the weather indicator 4 to communicate to the latter instantaneous position of the antenna.

The special receiver 6, which receives the landing aid information, is connected to the switching device 3 and to the antenna. Indeed, the pulses emitted by the weather transmitter, of for example frequency Fo, are reflected by the ground beacons 10 but at another frequency Fo + ΔF. The signals received by the antenna 2 comprise, depending on the type of antenna 2, an ordinary reception signal or sum signal ε and one or two angular measurement signals generally designated by Δ if it concerns an antenna of the "monopulse" type. The signal ε reaches the special receiver 6 through the switching device 3. A synchronisation signal S corresponding to a fraction of the emitted pulse is also transmitted to the receiver 6 by the switching device to permit the measurement of the distances by measuring the intervals of time between the signals S and ε.

In the course of the "cruising" stage, the signals ε correspond to the echoes of cloud obstacles or echoes from the ground and are directly transmitted to the weather receiver. These signals then have the same frequency Fo as that of the emission.

In the course of the landing stage, the function of the switching device is to switch the received signals relating to the beacons, of frequency Fo + ΔF, to the ILM special receiver 6.

The angular measurements signal or signals Δ, which are of no interest to the weather receiver, are sent directly to the ILM receiver 6.

The receiver 6 delivers the video signals, which are employed by processing device 7 also connected to the mechanical drive device 5 which indicates thereto the position of the antenna at each instant, to an indicator 8, which displays to the pilot the landing aid information, and possibly to an accelerometric aid device 9 whose purpose will be explained hereinafter.

In the system according to the invention, the weather transmitter is therefore common to the weather radar system and the ILM system. The antenna and the mechanical drive device of the latter are also common thereto. However, the antenna may be modified or exchanged with another antenna so as to produce one or two angular measurement signals. During the landing stage, the transmitted signals reach the semi-active beacons, with which the landing runway is equipped. The signals received are then processed by the special ILM receiver.

This presents a problem: the nature of the signals emitted is imposed, the characteristics of the weather system are previously defined (for example by A.R.I.N.C. standards). The duration of the pulses is long (5 to 6 microseconds) which would result, with a receiver normally adapted for the duration of these pulses, in a mean distance error (of the order of 80 meters and would preclude measurements of distances of less than 800 meters). The antenna scans the space with a low scanning speed (60° per second) in a wide angular region (±90°), which results in a low information renewal rate (one passage of the antenna about every four seconds). Lastly, the pulse repetition frequency is low (200 Hz), which is partly compensated for by the slowness of scanning. During the passage of the beam of the antenna over a target the latter receives about 10 pulses.

These features are insufficient to afford a suitable landing aid in which it is necessary to have good precision as concerns distance, up to a very short distance, and a high information renewal rate.

Although the duration and the repetition frequency of the pulses and the scanning speed of the antenna are those of the weather system, it is nevertheless possible, in accordance with the invention, to obtain sufficient information to afford a landing aid.

The distance precision is attained by effecting the measurement not on the entire pulses but on the leading edges of the pulses. The ILM receiver 6 therefore has receiving circuits having a band pass 10 to 20 times wider than that of the weather receiver so as to be able to clearly distinguish the edges of the pulses. The distance is measured by determining the interval of time between the rise edge or the fall of the emitted pulse and that of the received pulse. The distance error may then be less than 10 meters.

The measurement of short distances is rendered possible above all by the fact that the frequency of operation of the ILM receiver is different from the emission frequency. Thus it is possible for the receiver to operate before the ends of the emission of the pulses so as to be able to measure very short distances. Moreover, this receiver has adequate filtering means and possibly attenuating means which will be described thereinafter.

The angular precision is achieved by the monopulse methods or the amplitude comparison of received signals and improved here by adapting the band pass of the circuit or circuits of the angular measuring paths of the receiver to the duration of the received pulses. This is all the more possible as the beacons represent point targets devoid of surrounding echoes owing to the transposition of frequency Δ F.

As the invention relates to the association of novel ILM circuits with a known weather radar which exists on board the aircraft, this radar will not be described.

Only the antenna 2 which is an element of the weather radar, may be modified so as to deliver additional data which solely concerns the ILM receiver.

Indeed, the ILM system employs angular data to determine the position of the aircraft at each measurement with respect to a target. This angular data is the sum of two data obtained in different ways: the angular position of the axis of the antenna with respect to the aircraft, furnished directly by the mechanical drive device 5; and the direction of the target with respect to the axis of the antenna, furnished by the antenna (angular difference signals Δ ). This latter data can be obtained provided that a special "monopulse" type antenna, or an ordinary antenna associated with receiving elements permitting angular measurements by interferometry, is employed. This latter data can be also obtained from special beacons which will be described hereinafter.

Another arrangement permits dispensing with one of the angular measurements made by the antenna, the bearing measurement, which could be obtained solely from the bearing values delivered by the mechanical drive device 5. This type of measurement has been described in French Pat. No. 2 085 354 and the first addition thereto No. 2 124 085. The precise value of the bearing is obtained by obtaining the mean of the angular measurements upon the passage of the antenna over the target.

Another arrangement permits dispensing with the two angular measurements and employing the weather antenna without modification, that is to say an antenna having a single source and a reflector. The ILM system would then be limited to the bearing measurement given by the mechanical drive device in accordance with the method disclosed in the aforementioned patents. The landing could not longer be made in a manner completely independant of the ILS system which would have to indicate the angle of descent toward the landing runway to the pilot. However, this hybrid arrangement remains within the scope of application of the present invention.

FIG. 2 shows in detail the diagram of the special ILM receiver 6 and one embodiment of the switching device 3.

The antenna 2 is assumed to be of the monopulse type employing the sum path ε for the weather emission and reception. Two "difference" outputs deliver angular difference signals ΔS and ΔG which are sent to the receiver 6. The signals ΔS and ΔG are processed separately by the same receiver circuit by means of two change-over switches. One C1, upstream of the receiver and the other, C2, downstream of the receiver, afford a time division multiplex. The switch C1 is preferably disposed near to the antenna so that there is only a single microwave connection between the antenna and the receiver.

The switching device 3 comprises essentially a circulator 31. The signals emitted by the weather transmitter at frequency Fo are directly transmitted to the antenna. In reception, the signals of frequency Fo + ΔF coming from the beacons 10 are transmitted (as concerns the sum signals ε) to the ILM receiver whose first input circuit is a microwave filter having a band-pass centered on the frequency Fo + ΔF. The weather signals which have the frequency Fo are reflected by this filter 21, and return to the circulator 31 which transmits them to the weather receiver 1. The connection between the circulator 31 and the filter 21 of the receiver is of course arranged in such manner that this reflection of weather signals results in a minimum of losses.

A coupling device 32 permits taking off a fraction of the energy of the emitted pulses. These pulses are used for the demodulating circuit of the receiver and permit calculating the distances of the beacons in the processing circuit 7.

The receiver 6 comprises two identical receiving paths, one for the sum signals ε, the other for the angular difference signals Δ. The receiver is protected during the emission of the pulses owing to the fact that the frequency of reception differs by an amount ΔF from the emission frequency. This permits, moreover, eliminating the signals coming from the ground (the frequency of which is equal to that of the transmitter). This protection permits effecting measurements at short distances, it being possible for the echo signals to be received before the end of the emission pulse. The two receiving paths are moreover of wide band pass so as to permit determining the distance measurements on the leading edge of the pulses.

The path receiving the difference signals Δ comprises in succession a microwave filter 11, two synchronized change-over switches 12 and 15 for transmitting the output signals of the filter either through a microwave attenuator 13 or a direct connection 14 to a mixer 16, then a wide band-pass amplifier 17 and a narrow band filter 18.

The path receiving the sum signals also comprises a filter 21, a switch 22, an attenuator 23, a direct connection 24, another switch 25, a mixer 26, a wide band amplifier 27 and a narrow band filter 28.

The two mixers 16 and 26 receive the signal from a local oscillator 46.

The output signals of the amplifier 27 are sum signals ε of intermediate frequency. The form of the received pulses has been kept intact by the wide band reception path. These signals are transmitted through a switch C3 and a variable gain amplifier 20 to a detector 29 which delivers the sum signal ε as a video signal to the processing circuit 7. The signal S at the output of the coupling device 32 transposed into intermediate frequency in the circuits of the automatic frequency control loop which will be described hereinafter, then detected in the detector 40, is also transmitted to the circuit 7. The interval of time between the rise edges of the signals S and ε permits determining the distance to the beacons.

The switch C3 permits applying to the processing circuit 7 either rectangular pulses taken from the output of the wide band amplifier 27, or triangular pulses taken from the output of the adapted narrow band filter 28. At the output of this filter the signal -to- noise ratio is the best. In the first case, the distance measurement is precise (error less than 10 meters) and the switch C3 is placed in the corresponding position as soon as the distance between the aircraft and the landing runway is less than a certain distance (for example 10 kilometers). In the second case and the other position of the switch C3, the distance measurement is less precise (error of 50 to 100 meters) but sufficient for the pilot when the aircraft is at a great distance from the landing runway. The switching of the switch C3 may be automatic and controlled by the distance measuring circuit (which is not shown in the figure).

The intermediate frequency signals delivered by the sum and difference paths (outputs of the filters 18 and 28) are applied to a combining circuit 19 determining the angular difference, followed by the switch C2 which separates the sight ΔS and bearing ΔG data and applies them to processing circuit 7. The circuit 19 is known in particular from French Pat. Nos. 2,032,117 and 1,422,950.

This arrangement is characterized mainly in that where ε and Δ are the summation and differential signals, means are provided for making the sums $S=|\Sigma + j\Delta|$ and $T=|\Sigma - j\Delta|$, for detecting the phase difference of these two signals S and T and for supplying a signal which represents this respective phase difference.

A control circuit 41 is provided for controlling the switches 12, 15, 22 and 25. This circuit receives the output signal from the detector 40 so that the output signals of the microwave filters 11 and 21 are transmitted to the mixers 16 and 26 through the attenuators 13 and 23 during the duration of the emission pulse and through the direct connections 14 and 24 after the end of this pulse. The attenuators 13 and 23 afford a further protection of this receiver circuits during the duration of the emission pulse if the sole filtering at 11 and 21 is insufficient. These attenuators also weaken the useful signals coming from the beacons which is not in fact an inconvenience since in this case the distance to the beacons is small and the signals are received at a high level. The receiver is moreover provided in each receiver path with variable gain amplifiers, such as amplifier 20, which is the sole amplifier shown in the sum path. The gain of this amplifier increases exponentially with time from the start of the emission of the pulse so that the echoes received always have an amplitude independent of the distance. In order to compensate, during the duration of the pulse, for the loss of gain due to the attenuators 13 and 23, increase in gain of the same value can be provided by these variable gain amplifiers.

The local oscillator 46 is included in a conventional automatic frequency control loop comprising between its frequency control input and its output, in succession, a frequency discriminator 45, a narrow band amplifier 44 and a mixer 43. The emission signal taken off by the coupler 32, having frequency Fo is transposed at the frequency Fo + Δ F in the transposer 42 whose output is connected to the mixer 43. The operation of such a loop is known in the art. The signal S for the detector 40 and then the circuit 7 is taken from the output of the amplifier 44.

The transposer 42 is similar to those with which ground beacons are equipped and serves to frequency control the oscillator 46.

In some aerodromes several landing runways are provided for the aircraft.

In this case, in order to avoid any confusion, the beacons relating to each runway have a frequency shift ΔF which is different from the beacons of one runway to these of the other. The ILM receiver is then provided with as many transposer circuits 42 as there possible runways; all these circuits are inserted in the automatic frequency control circuit in the known manner, for example by means of switches.

FIG. 3 shows another type of switching device 3 which comprises a change-over switch 33, a duplexer or circulator 34 and a coupler 35. When in "weather" operation, the connections achieved in the switch are shown in dotted line. It can be seen that the transmitter-receiver 1 is directly connected to the antenna 2. The receiver 6 is out of circuit. In "landing" operation, the connections are those shown in full line. The signals emitted by the transmitter are transmitted to the antenna through the duplexer 34. The signals ε received by the antenna at frequency Fo + ΔF reach the receiver 6 through the duplexer 34. The coupler 35 delivers the signals S for the emission.

If this device is equipped with a circulator instead of the duplexer 34, the signals received at frequency Fo are reflected by the input filter of the receiver 6 toward the weather receiver, as in the case shown in FIG. 3. The weather receiver can still operate in the course of the landing stage.

The processing circuit 7 (FIGS. 1 and 2) receives from the receiver 6 the video signals of the angular differences ΔS and ΔG and the video signals ε and S for the distance measurements. It also receives the bearing measurements of each beacon delivered by the mechanical drive device 5 and possibly data from an accelerometric unit 9.

This processing device works out from the signals received a certain number of data of use in the course of landing:

angular difference between the path of the airport and the vertical plane of symmetry of the landing runway;

the angular difference with respect to the theoretical axis of descent (or "ILS axis") in the vertical plane of symmetry of the runway;

angle between the course of the aircraft and the axis of the runway;

distance to the theoretical touch down point of the wheels;

the distance to the end of the runway, the cartesian coordinates of the aircraft with respect to a reference related to the runway;

the velocity vector with respect to the ground in magnitude and direction;

and possibly the data necessary for the synthetic representation of the landing runway and the future touch down point of the wheels.

The structure and operation of the circuits which constitute the processing unit 7 and the indicator 8 have been described in French Pat. No. 2,085,354 and French Pat. No. 2,124,085.

While the system shown in FIG. 1 represents a navigation system according to the invention in its most sophisticated form, other systems of the same type may be designed based on the association of a weather radar and a special receiver. These systems may be employed as a primary landing aid system or as a system in addition to another device such as the ILS.

Apart from the basic system which effects the distance measurements and angular measurements and benefits from an accelerometric aid, other devices may be designed either from the elements described hereinbefore or by associating these elements with other navigation systems (ILS, radioaltimeter, barometer, etc...).

FIG. 4 shows an example of the association of the system according to the invention with an altimetric measuring device.

The weather radar circuits are identical to these shown in FIG. 1. The antenna 2 is an ordinary antenna giving no indication of angular differences. The ILM receiver 6 then has only a single reception path, the sum path ε parallel with the detection of the synchronization signal S for the distance measurements.

The bearing data is given directly by the mechanical drive device 5. The elevation data is obtained by combining the distance and altitude measurements furnished by the navigation equipment on board the aircraft and shown generally at 50. At a great distance, the altitude is delivered for example by a barometric device whereas in proximity to the landing runway or more precise measurement of the altitude is furnished by an airborne radioaltimeter : the elevation value is then obtained in the processing device 7 by the quotient of the altitude over the distance.

The indicator device 8 may be of the same type as in the case shown in FIG. 1.

This system permits obtaining the same data as the system shown in FIG. 1. As this data is obtained independently of a ILS system, the described system constitutes an ILM.

Figure 5:
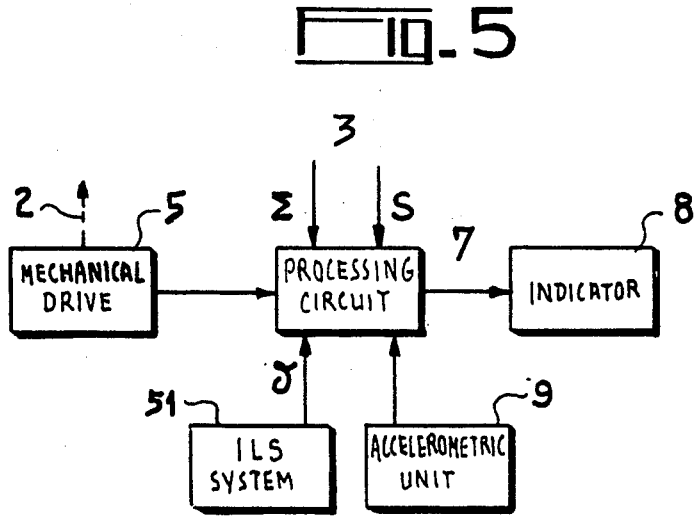
FIG. 5 is a modification of the preceding system.

FIG. 5 shows a partial modification of the preceding system. The weather and reception part 6 has not been shown and it is identical to preceding FIG. 4. This time the processing device receives the signals from the receiver 6 so as to determine the distances therefrom. It receives the bearings from the mechanical drive device 5 of the antenna. The elevations are obtained from data furnished by an ILS system 5I if it exists onboard the aircraft.

The ILS, or any other equivalent system 51, furnishes an angular indication θ which represents the difference between the theoretical axis of descent and the projection, on the vertical plane containing this axis, of a line passing through the aircraft and the theoretical landing point. As the theoretical angle the ILS axis makes with the horizontal and the distance of the aircraft from the theoretical landing point (obtained from the measurement of the distances of the beacons) are known in advance, the altitude of the aircraft and then the sights of the various beacons are deduced therefrom. The remainder of the processing is then identical to that the preceding case (FIG. 4). However, the system depends on the ILS. It can nonetheless determine the deviations of the aircraft with respect to the vertical plane of symmetry of the landing runway and thus check the values determined by the ILS.

The system shown in FIG. 5 may again be employed independently of the ILS system. In this case, the aircraft tries to follow the ideal path with the aid of the ILS. The system according to the invention permits determining the deviation of the aircraft with respect plane of symmetry of the runway. The synthetic representation of the latter is again possible, assuming that the aircraft follows the slope determined by the ILS. Independently of the ILS, the system may again determine the precise values of the stopping distance, the distance to the end of the runway etc.

The various versions described hereinbefore may be employed without an accelerometric aid, in particular in the case where the aircraft is made to follow by automatic piloting the theoretical path of the ILS. The data received by the system is true only at the instant of measurement. As the rate of renewal of the data is low, the system is blind between two measurements. The desired data can however be reconstituted by extrapolation of the preceding measurements in assuming that the variations of these measurements follow, as a function of time, a linear law, or any other law. An integrator device, associated with a memory for example, affords such an extrapolation.

Another system is now described, which does not need a monopulse antenna but only a ordinary antenna giving no indication of angular differences and which is independant of systems on the ground, such as ILS. The bearing and elevation data are obtained by comparing the signals retransmitted by the beacons. Each beacon on the ground does not re-transmit the "weather" pulses with only one difference frequency, but with two or four different frequencies.

The ground beacons therefore comprise means for re-transmitting the signals received at at least two frequencies different from the frequency of said received signals, means for re-transmitting these signals in accordance with respective radiation patterns the maximum radiation directions of which are offset from each other so as to define at least one plane in space in each point of which plane equality in amplitude of the signals re-transmitted at two different frequencies is achieved, the amplitude of one of the signals being preponderant on one side of said plane and the amplitude of the other signal being preponderant on the other side of said plane, and the special receiver, on board the aircraft, comprises means for comparing the amplitudes of the signals it receives from the beacons.

The angular measurements effected on board the aircraft are therefore made with respect to the beacons and no longer depend on the type of antenna on board the aircraft. Each beacon defines at least one reference plane with respect to which the aircraft determines its deviation by transmitting to the beacon pulses at the weather frequency and receiving and comparing the signals retransmitted by the beacon.

The system has delivers data for aiding the landing on, and the approach of, an aerodrome. These data are angular data concerning the deviation as concerns elevation and bearing of the real path of the aircraft with respect to an ideal path. This ideal path is a straight line which is contained in the vertical plane containing the axis of the runway, leads to the theoretical touch down point on the runway and makes a given angle with the plane of the runway.

Other data, such as the distances between the aircraft and the beacons, associated with these regular magnitudes, permit deducing the position of the aircraft for each pulse received.

Figure 6:
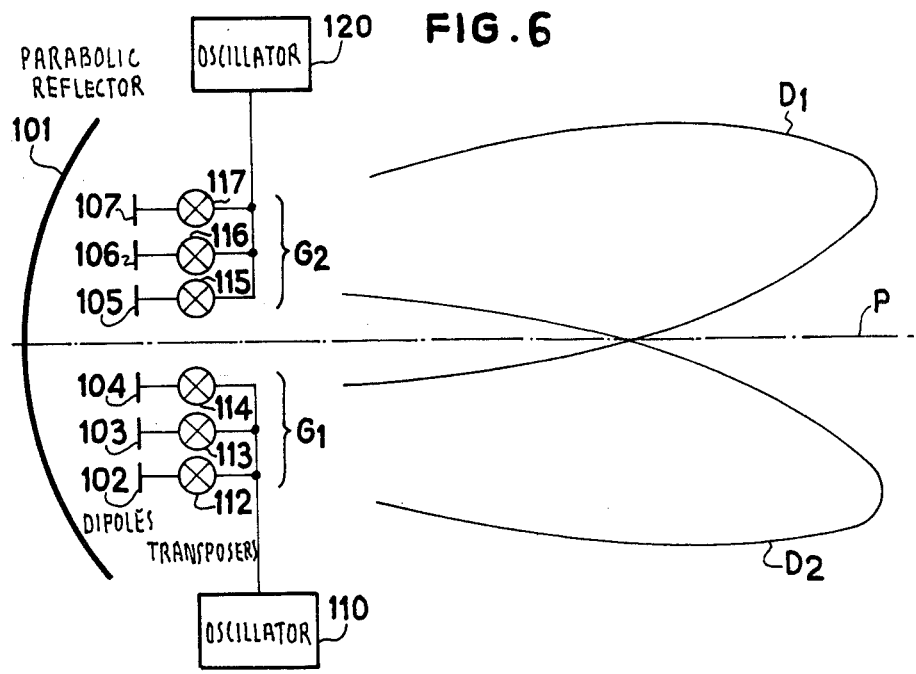
FIG. 6 is a detailed diagram of a beacon comprising two groups of sources.

The reference elements for the measurements of these angular data are given by beacons on the ground. These beacons are two in number. They are usually identical. FIG. 6 shows one thereof.

The beacon comprises a parabolic reflector 101 whose focal surface is equipped with an assembly of elementary sources (for example dipoles as shown in the figure) 102 to 107. Each dipole is connected to a transposer or modulator (respectively 112 to 117). When the beacon receives a signal from a transmitter on board an aircraft, the modulation creates lateral bands on each side of the carrier frequency of the signals received. It is one of these lateral bands which is the sole band received by the special receiver.

The elementary sources of the beacon and the associated transposers are arranged in two groups G1 and G2 which are symmetrical with respect to one of the main planes of radiation of the beacon. The first group G1 (dipoles 102, 103, 104, transposers 112, 113, 114) is connected to an oscillator 110. The second group G2 (dipoles 105 to 107, transposers 115 to 117) is connected to an oscillator 120. The oscillators operate at different frequencies so that the signals re-transmitted by the beacon will have different frequencies, depending on whether they come from the first or the second group. The radiation pattern D1 of one of the groups does not have the same orientation as the radiation pattern D2 of the other group. At the intersection of these two patterns, the signals are of equal amplitude. This intersection defines the reference plane P of the beacon embodied by the dot-dash line in the figure. An aircraft located in the reference plane perceives the signals re-transmitted by the beacon with the same amplitude. As soon as it deviates from this reference plane, the re-transmitted signals are no longer equal. The preponderance of one or the other indicates to the pilot on which side of the reference plane the aircraft is situated. The difference or the ratio of the amplitudes of the signals received by the special receiver of the aircraft indicates the angular difference between the straight line passing through the bacon and the aircraft and the projection of this line on the radiation reference plane of the beacon.

Based on the same principle, beacons producing not one but a plurality of reference planes can be envisaged.

Figure 7:
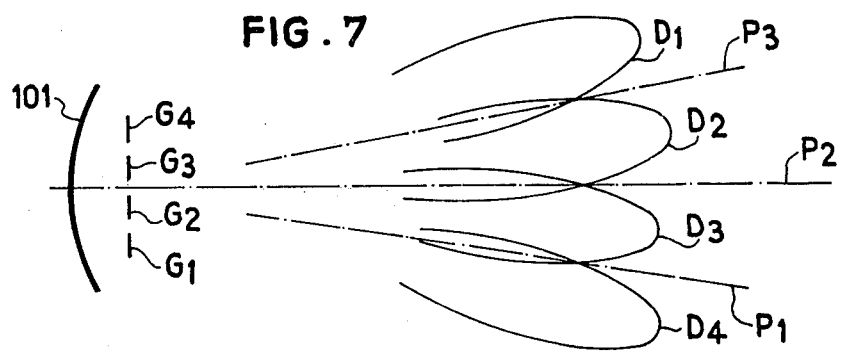
FIGS. 7 and 8 show examples of beacons comprising four groups of sources.

FIG. 7 shows an embodiment of a beacon in which a plurality of groups of sources G1, G2, G3 and G4 are lined up to produce this time four patterns D1, D2, D3 and D4 defining by their intersections three reference planes P1, P2 and P3. These planes are deducted from each other by a rotation. The groups of sources are of course associated with as many oscillators of different frequencies which have not been shown for reasons of simplicity of the figure. At the receiver end, the comparisons of the amplitudes of the signals received, taken in pairs, permit determining three angle values each one of which represents a deviation with respect to one of the reference planes defined hereinbefore.

Figure 8:
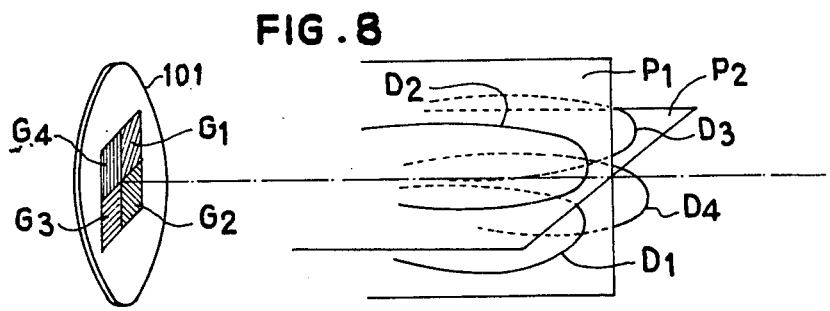

FIG. 8 show another type of beacon comprising, arranged in front of the reflector 101, four groups of sources and transposers G1, G2, G3, G4 associated with four oscillators (not shown). The four groups are disposed on each side of two main planes of symmetry P1 and P2 of the antenna. These two planes are perpendicular and their intersection is the axis of symmetry of the antenna. These planes divide the space into four quadrants each of which contains one of the four radiation patterns D1, D2, D3 or D4. At every point on the axis of symmetry, the amplitudes of the four signals re-transmitted by the beacon are equal. If one of the planes of symmetry is horizontal and the other vertical, the comparisons of the amplitudes of the signals received on board the aircraft can give directly an indication of the elevation and bearing of the direction in which the aircraft is disposed. These planes of symmetry constitute the reference planes of the beacon.

The beacons according to the invention are employed on the aerodrome in proximity to the landing runway. There are various possibilities of utilisation of these beacons.

Figure 9:
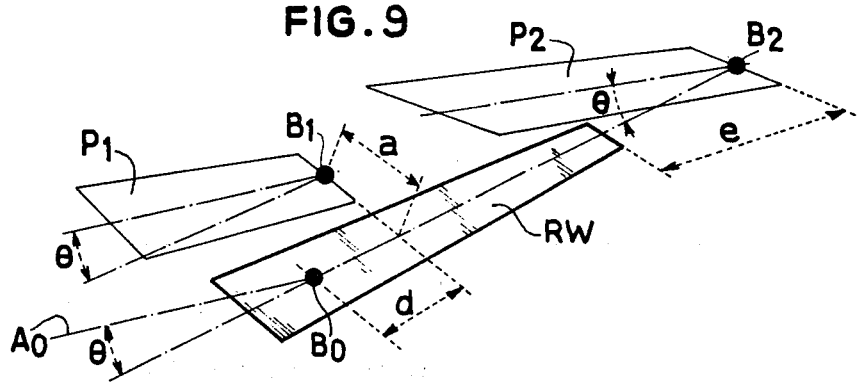
FIGS. 9 and 12 are perspective views of the landing runway equipped with two beacons.

FIG. 9 is a perspective view of the landing runway RW equipped with two beacons B1 and B2. Each one thereof defines a reference plane (P1, P2) or plane of symmetry. The intersections between these planes and the surface of the ground are straight lines perpendicular to the axis of the runway. The beacon B1 is located on the side of the runway at a distance $a$ from the axis of the runway and is projected on this axis at a distance $d$ from the point Bo of touch-down of the wheels. The beacon B2 is located on the axis of the runway at a distance $e$ from the end of the runway. The reference planes P1 and P2 of the two beacons B1 and B2 are inclined with respect to the plane of the runway at the same angle $\theta$ as the theoretical angle of descent defined by an ILS. The theoretical axis of descent is shown at AoBo; it makes an angle $\theta$ with the axis of the runway.

The two beacons B1 and B2 are exactly identical. However, they are detected separately by the receiver on board the aircraft since they are at distinct distances from the latter. The receiver on the aircraft comprises filtering means for separating the signals re-transmitted by each group of elementary sources and comparing the amplitudes of these signals, which permits deducing the angular positions of the aircraft with respect to the reference plane of the beacons. This data then permits re-constituting in the vertical plane the angular data of position of the aircraft. From the angular measurements obtained and from the distance measurements effected by the processing device following on the receiver, there is obtained the value of the angle $\theta$, which is the difference between the ideal path and the path followed by the aircraft.

Figure 10:
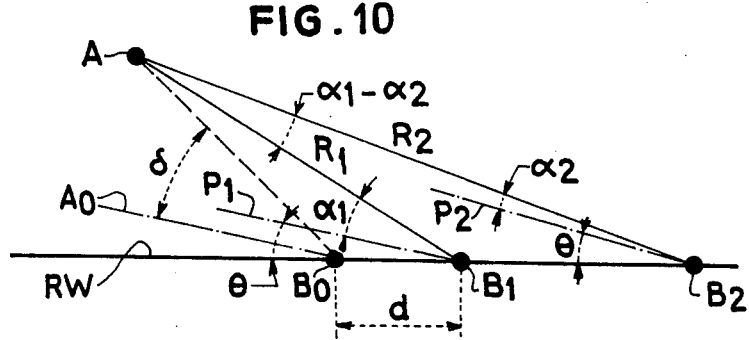
FIG. 10 is a view of the landing runway in the vertical plane.

FIG. 10 represents these different measurements projected in the vertical plane containing the axis of the runway and permits an understanding of the calculations which are carried out in the known manner in the processing device.

Shown on the plane of the runway represented in thick lines are the point Bo of the point of touch down, and the beacons B1 and B2. Drawn from the point Bo, the axis AoBo represents the ideal descent axis. Drawn from the points B1 and B2, the axes P1 and P2, parallel to the ideal descent axis AoBo, represent the projections, on the plane of the figure, of the radiation reference planes of the beacons. From the aircraft A, the landing aid system measures the distances R1 and R2 between the aircraft and the beacons B1 and B2 respectively and the angles $\alpha 1$ and $\alpha 2$ between the position of the aircraft and the reference planes of the beacons respectively.

The value of the difference $\theta$ between the straight lines ABo and AoBo is:

$$\theta = \frac{R1\,R2\,(\alpha 1 - \alpha 2)}{(R1 - d)(R2 - R1)} - \frac{\alpha 1\,R1 - \alpha 2\,R2}{R2 - R1}$$

The value $\theta$ is calculated by the processing device and presented to the pilot in a measuring apparatus or on a device giving a synthetic representation of the landing runway. The circuits which are required in the processing device for effecting this operation are less numerous than in the case of a system effecting the angular measurements with the aid of an antenna of the "monopulse" type.

In the horizontal plane, the angular values are measured by the utilisation of the scanning of the antenna.

However, they may be measured by employing beacons on the ground each one of which has two planes of symmetry. The plane of symmetry, inclined as the slope of descent, permits measuring the difference $\theta$ and the vertical plane of symmetry permits measuring the difference $\gamma$ with respect to the axis of the runway. Beacons having two reference planes are employed.

Figure 11:
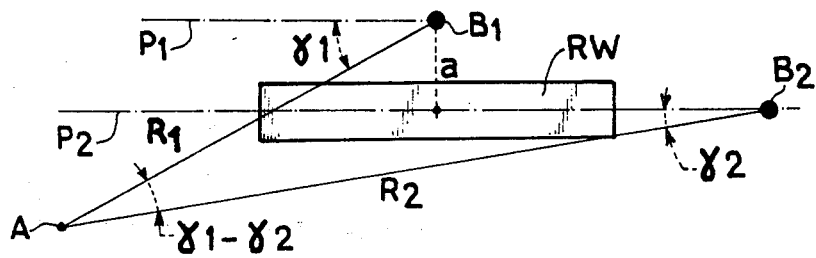
FIG. 11 is a view of the landing runway in the horizontal plane.

FIG. 11 shows in the plane of the landing runway the two beacons B1 and B2 arranged as in the case shown in FIG. 9. The reference planes P1 and P2 of the two beacons are vertical and are parallel to the vertical plane containing the axis of the landing runway. The aircraft A measures the distances R1 and R2 to the beacons B1 and B2 respectively, and the diviations $\gamma 1$ and $\gamma 2$ from the respective planes of symmetry. The values of the angle $\gamma$ is:

$$\gamma = \frac{R1\,(\gamma 1 - \gamma 2) - a}{R2 - R1}$$

The beacon B2 is near to the radio beacons of runway alignment of an ILS, if it exists. The value of $\gamma 2$ is then practically identical to the deviation $\gamma$ furnished by the ILS. The utilization of the preceding calculation therefore furnishes an additional checking means which constitutes an internal redundancy inherent in the system. But if, furthermore, the position of the beacon B1 is the same as that of the radio beacons of the descent alignment of the ILS, that is to say if $d = o$, the deviation indication determined by this beacon will give directly the deviation $\theta$ from the theoretical axis of descent.

Figure 12:
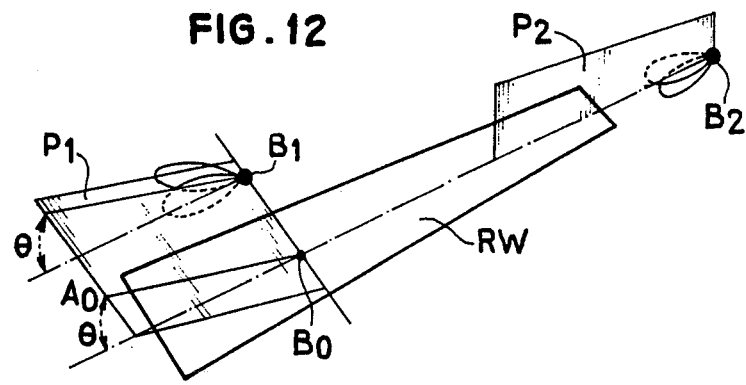

FIG. 12 employs this property. The beacons B1 and B2 are located very near to the beacons of the ILS. The beacon B2 is located on the axis of the landing runway. It is a beacon having a single reference plane P2, as that shown in FIG. 6. This reference plane is vertical. The measurement of the angular deviation on board the aircraft indicates immediately the deviation $\gamma$. The beacon B1, is also a beacon having a single reference plane P1. This plane is inclined at an angle $\theta$ to the plane of the runway. The deviations measured in the aircraft coincide with the angle $\theta$ which an ILS would give.

The receiver on the aircraft differs slightly from the version described herein before. Indeed, it must permit the distance measurements, on one hand, and the amplitude measurements of the signals received at the different frequencies transmitted by the beacons, on the other.

As the antenna of the monopulse type is no longer necessary, a single receiving path is sufficient. The circuit for producing the synchronization signal which determines the exact instant of the emission for effecting the distance measurements, remain unchanged. Solely the receiving part proper is changed, since it must permit the comparison of the amplitudes of the signals retransmitted by the beacons at different frequencies.

Figure 13:
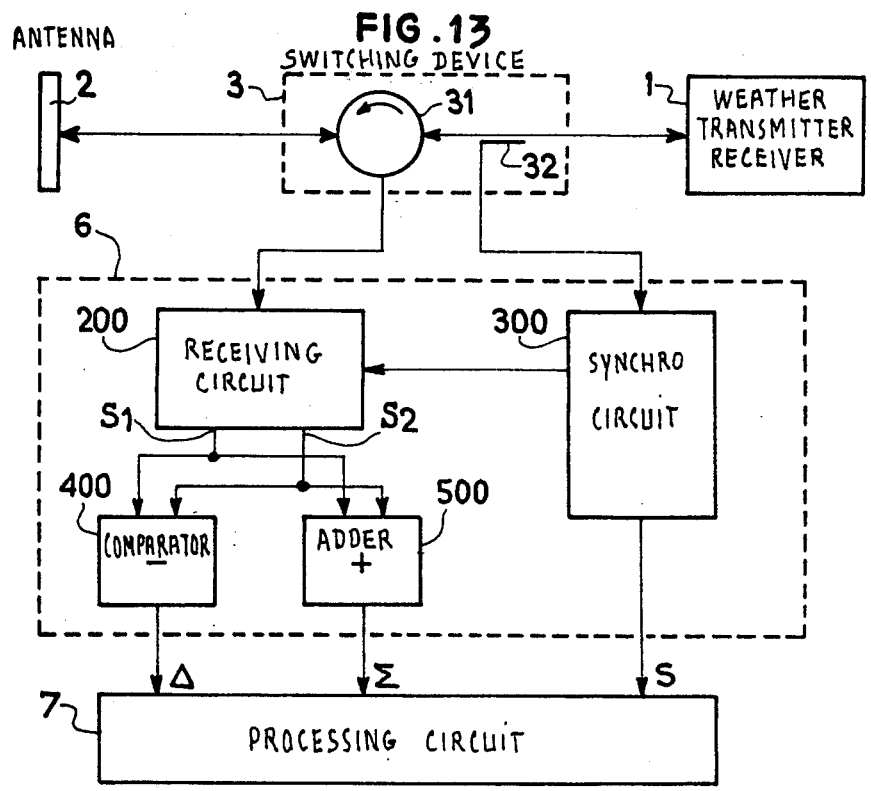
FIG. 13 is the general diagram of a special receiver.

FIG. 13 shows the general diagram of a special receiver associated with the other elements of the navigation aid system.

The weather transmitter-receiver 1 is coupled to the antenna 2 through a coupling device 3 which, in reception, sends the signals of the beacons to the special ILM receiver 6. The latter receives two signals coming from the switching device: a reception signal from the circulator 31 and a synchronization signal delivered by the coupler 32 at the moment of emission.

The synchronization signal is treated in a circuit 300 termed a "synchronization circuit" in the ensuing description. This circuit comprises, with reference to FIG. 2, a transposer circuit 42 identical to those provided in the beacons, a local oscillator 46 required for the change in frequency of the signals received, an automatic frequency control loop (43, 44, 45) for controlling the frequency of the local oscillator, and a detector 40 delivering, at video frequency, the synchronization signal S to the processing circuit 7 which employs it for effecting the distance measurements. The reception signals delivered by the circulator 31 are applied to the receiving circuit 200. This circuit is a wide band circuit, since it receives signals of different frequencies returning from the beacons. It comprises filter means for separating the signals re-transmitted by each beacon. This separation may be effected in hyperfrequencies or intermediate frequencies. The signals are thereafter detected separately and the circuit 200 delivers two signals S1 and S2 (or four signals if the beacons re-transmit the signals with four different frequencies). These signals are applied to a comparator 400 which delivers a signal Δ which is a function of the difference of the amplitudes of the signals S1 and S2. The comparator is an amplifier having differential inputs for example. An adder 500 is possibly employed for receiving the two signals S1 and S2 and delivering a signal ε which determines the instant of reception of the signal from the beacons. The measurements of the distances is effected on the leading edges or trailing edges of the pulses emitted or received. The circuit 500 must therefore have a band-pass which is wide enough to safeguard these leading and trailing edges. The signals ε and Δ are then applied to the processing circuit 7. As the ground beacons are at different distances from the aircraft, the signals relating thereto are not received simultaneously. The processing circuit 7 thus recognizes and separates the distance and angle data for each beacon.

FIG. 14 and 15 show two embodiments of a receiver circuit 200 in which the separation of the beacon signals is effected at hyperfrequency. They both comprise a diplexer 201 receiving the signals received by the antenna and switched by the circuit 3 and delivering two distinct signals, one at frequency Fo + ΔF1, the other at frequency Fo + ΔF2, Fo being the frequency of emission of the weather radar, ΔF1 and ΔF2 representing the frequency transpositions carried out by each beacon.

The output signals of the diplexer 201 are applied to two mixers 202 and 203 which also receive the signal from the local oscillator which is in the synchronization circuit 300 (FIG. 13) and deliver respective signals at intermediate frequency. These signals are then amplified by two preamplifiers 204 and 205. The remainder of the reception differs in FIGS. 14 and 15. In FIG. 14, the signals received remain separated up to the output of the circuit 200. They pass in succession through logarithmic amplifiers 206 and 207 and detectors 208 and 209 and are then transmitted to the comparator 400 and to the adder 500 (FIG. 13).

In FIG. 15 one of the signals received is delayed in a delay line 210 the output of which is connected, at the same time as the output of the preamplifier 205, to a logarithmic amplifier 211 and then a detector 212.

In the case shown in FIG. 14, the signals remain simultaneous but are treated in separate circuits, whereas in the case shown in FIG. 15, they are separated with respect to time and then treated in the same circuit. In the latter case, the comparison of the amplitudes of the signals is effected, for example, directly in the processing circuit 7, after digital coding, without passing through the comparator circuit 400 and adder circuit 500 which are eliminated.

FIG. 16 and 17 show the receiving circuits in which the separation of the signals is effected at intermediate frequency.

They both comprise in series a band-pass filter 220 which eliminates the weather frequency and transmits only the signals of the beacons at frequencies Fo + ΔF1 and Fo + ΔF2; this circuit thus eliminates the ground echoes, a mixer 221 receiving also the signals of the local oscillator in the synchronization circuit 300, a wide band preamplifier 222 and a diplexer 223 which effects the separation at intermediate frequency of the two signals of each beacon. The remainder of the reception is similar to the cases shown in FIGS. 14 and 15. In the case of FIG. 16, the signals remain separated and pass through in succession, logarithmic amplifiers 224 and 225 and detectors 226 and 227. They are thereafter compared and added by the circuits 400 and 500, then transmitted to the processing circuit (FIG. 13).

In the case shown in FIG. 17, one of the signals of the beacon is transmitted directly to a logarithmic amplifier 229, and, the other, through a delay line 228. The two signals are staggered in time and thereafter applied to a single detector 230 and then applied to the processing circuit 7.

FIG. 18 illustrates a last example of the receiving circuit 200 in which the separation of the signals of the beacons is effected as near as possible to the processing circuit so as to make the signals of the beacon follow the same path and reduce errors in the angular measurements.

It comprises in series, as in the preceding cases, a band-pass filter 220, a mixer 221, a wide band preamplifier 222. Then the signals are applied to a limiter amplifier 231 and separated by a diplexer 223. The separated signals are applied to the detectors 226 and 227, then compared and added by the circuits 400 and 500 respectively before being applied to the processing circuit 7.

In the case of examples shown in FIGS. 14 to 18, the circuits must have frequency bands sufficiently wide to transmit the rise edges and fall edges necessary for the distance measurement. However, in respect of the angular measurements, only the amplitude of the signals is employed in the processing which follows and a narrower frequency band would be sufficient. This is why it is possible to provide in all the figures, before the diplexer for example, a branch circuit for switching the signals received to wide band circuits for the distance measurements alone. The other circuits of the unit 200 would then no longer necessarily have wide frequency bands.

What we claim is:

1. An air navigation and landing aid system comprising on the ground: at least one transponder beacon for receiving pulses having a predetermined frequency and retransmitting said pulses with at least one frequency which is different from said predetermined frequency, each beacon being located at a predetermined position with respect to a landing runway,
and in an aircraft;
an antenna;
a mechanical drive device for the antenna;
a weather transmitter-receiver coupled to the antenna, for emitting pulses at said predetermined frequency, for receiving echo signals having said predetermined frequency in response to said emitted pulses and for furnishing information affording a navigation aid during the flight stage;
a special receiver for receiving the pulses re-transmitted by each beacon in response to the interrogation of the weather transmitter during the landing stage;
switching means, inserted between said antenna and the weather transmitter-receiver, for switching, during the landing stage, the received pulses, relating to each beacon, to said special receiver, and
a process circuit connected to said special receiver and to the mechanical drive device for the antenna, for furnishing information about at least the relative position and the relative path of the aircraft with respect to the landing runway, for affording a landing aid.

2. A system as claimed in claim 1, wherein said switching means comprise a circulator circuit and a coupling device for transmitting to the special receiver a fraction of the energy of each emitted pulse.

3. A system as claimed in claim 1, wherein said switching means comprise a change-over switch having two positions, for connecting the weather transmitter-receiver to the antenna, directly in the first position, and through a duplexer in the second position of the switch, said duplexer having an output connected to the special receiver, and a coupling device for transmitting to the special receiver a fraction of the energy of each pulse emitted by the weather transmitter.

4. A system as claimed in claim 1, wherein said switching means comprise a change-over switch having two positions, for connecting the weather transmitter-receiver to the antenna, directly in the first position, and through a circulator in the second position of the switch, said circulator having an output connected to the special receiver, and a coupling device for transmitting to the special receiver a fraction of the energy of each pulse emitted by the weather transmitter.

5. A system as claimed in claim 1 wherein said special receiver comprises a first channel for receiving a fraction of the energy of each pulse emitted by the weather transmitter, a second channel for receiving each pulse received by the antenna from each beacon, said first and second channel having wide pass-band circuits for transmitting the rise edge and the fall edge of each pulse to the processing circuit, and wherein said processing circuit comprises means for measuring the interval of time between one of the edges of each pulse emitted and the same edge of the corresponding pulse received from each beacon.

6. A system as claimed in claim 5 wherein said special receiver comprises at least one third channel for receiving an angular difference signal and wherein the antenna comprises means for providing said angular difference signal at each received pulse, connected directly to said third channel of the receiver.

7. A system as claimed in claim 6 wherein said third channel comprises narrow pass-band circuits which are adapted to the received pulses.

8. A system as claimed in claim 1, wherein each beacon on the ground comprises means for re-transmitting pulses received at at least two frequencies different from the predetermined frequency, means for re-transmitting said pulses in accordance with respective radiation patterns whose directions of maximum radiation are offset from each other so as to define at least one reference plane in space at each point of which plane the pulses re-transmitted at two different frequencies are made equal in amplitude, the amplitude of one of the pulses being preponderant on one side of said plane and the amplitude of the other pulses being preponderant on the other side of said plane, and wherein the special receiver on board the aircraft comprises means for separating and comparing the amplitudes of the signals it receives from the beacon.

9. A system as claimed in claim 8, comprising two beacons, each beacon comprising a reflector, an assembly of sources placed in the focal plane of said reflector and divided into two groups which are geometrically offset from each other with respect to a reference plane, an assembly of frequency transposing circuits coupled respectively to said sources and two oscillators of different frequency each oscillator being connected to all the transposer circuits which are coupled to the sources of the same group, one of the beacons being located on the axis of the landing runway beyond the end of the runway, the other beacon being located on one side of the runway, and the reference planes of said beacons being parallel to a predetermined descent plane for the aircraft.

10. A system as claimed in claim 8, comprising two beacons, each beacon comprising a reflector, an assembly of sources placed in the focal plane of said reflector and divided into two groups which are geometrically offset from each other with respect to a reference plane, an assembly of frequency transposing circuits coupled respectively to said sources and two oscillators of different frequency, each oscillator being connected to all the transposer circuits which are coupled to the sources of the same group, one of the beacons being located on the axis of the landing runway beyond the end of the runway, its reference plane being coincident with the vertical plane containing the axis of the runway and the other beacon being located on one side of the runway, its reference plane being parallel to a predetermined descent plane for the aircraft.

11. A system as claimed in claim 8, comprising two beacons, each beacon comprising a reflector, an assembly of sources placed in the focal plane of said reflector and divided into four groups which are geometrically offset from each other with respect to two perpendicular reference planes, an assembly of frequency transposing circuits coupled respectively to said sources and four oscillators of different frequency, each oscillator being connected to all the transposer circuits which are coupled to the sources of the same group, one of the beacons being located on the axis of the landing runway beyond the end of the runway, the other beacon being located on one side of the runway, and the two reference planes of said beacons being parallel to the vertical plane containing the axis of the runway and a predetermined descent plane for the aircraft, respectively.

12. A system as claimed in claim 8, wherein the special receiver comprises a diplexer circuit for separating the signals re-transmitted by each beacon, said diplexer circuit having two outputs, a comparing circuit for delivering a signal which is a function of the angular deviation of the aircraft with respect to a reference plane, said comparing circuit having two inputs, and two identical channels connected between said diplexer circuit and the comparing circuit, each channel comprising, in succession, a mixer, a preamplifier, a logarithmic amplifier and a detector.

13. A system as claimed in claim 8, wherein the special receiver comprises a diplexer circuit for separating the signals re-transmitted by each beacon, said diplexer circuit having two outputs, a first channel, connected between a first output of said diplexer circuit and the processing circuit, comprising, in succession, a mixer, a preamplifier, a delay line, a logarithmic amplifier and a detector, and a second channel connected between the second output of said diplexer circuit and the output of said delay line and comprising a mixer and a preamplifier in succession.

14. A system as claimed in claim 8, wherein the special receiver comprises in succession, filtering means for eliminating the signals of the frequency of the weather transmitter, frequency changing means, amplifying means, a diplexer circuit having two outputs for separating the signals re-transmitted by each beacon, a comparing circuit, having two inputs, for delivering a signal which is a function of the angular deviation of the aircraft with respect to a reference plane, and two identical channels connected between said diplexer circuit and the comparing circuit, each channel comprising, in succession, a logarithmic amplifier and a detector.

15. A system as claimed in claim 8, wherein the special receiver comprises in succession, filtering means for eliminating the signals of the frequency of the weather transmitter, frequency changing means, amplifying means, a diplexer having two outputs for separating the signals re-transmitted by each beacon, a logarithmic amplifier and a detector connected in series between one output of the diplexer and the processing circuit, and a delay line connected between the two outputs of said diplexer.

16. A system as claimed in claim 8, wherein the special receiver comprises, in succession, filtering means for eliminating the signals of the frequency of the weather transmitter, frequency changing means, amplifying means, a limiter amplifier, a diplexer having two outputs for separating the signals re-transmitted by each beacon, a comparing circuit, having two inputs, for delivering a signal which is a function of the angular deviation of the aircraft with respect to a reference plane, and two detectors respectively connected between the diplexer circuit and the comparing circuit.

17. A system as claimed in claim 1 wherein an altimetric measuring device is coupled to the processing circuit.

18. A system as claimed in claim 1, wherein an Instrument Landing navigation system (ILS) is coupled to the processing circuit.

* * * * *